3,546,194
PROCESS OF ALKYLATING STYRENE POLYMERS
Josef Dasch, Haltern, and Anton Schick, Marl, Germany, assignors to Chemische Werke Huls A.G., Marl, Germany
No Drawing. Filed Apr. 19, 1966, Ser. No. 543,550
Claims priority, application Germany, Apr. 23, 1965, 1,570,348
Int. Cl. C08f 7/04, 15/04
U.S. Cl. 260—93.5     3 Claims The invention relates in general to a process of alkylating vinyl aromatic hydrocarbons, and more particularly, to thermoplastic polymers of alkyl-substituted styrene.

Polystyrene has been alkylated heretofore with olefins and alkyl halides in the presence of Friedel-Crafts-catalysts (see U.S. Pats. 2,651,628 and 2,614,080). However, the alkylated polystyrenes obtained by such processes are, in many cases, decomposed during the alkylation process and they cannot be further processed to form molded bodies.

Very often alkylated polystyrenes produced by the Friedel-Crafts reaction have softening points lower than the starting polystyrene (see British Pat. No. 688,082 and U.S. Pat. 2,282,456). For example, when polystyrene is alkylated with tert.-butyl chloride in the presence of aluminum chloride, relatively low-molecular products are obtained which are soluble in hydrocarbons and are employed as additives in fuel oils. (See Boundy-Boyer, "Styrene" (1952), page 873, lines 7–10.)

To produce thermoplastic polymers of alkyl-substituted styrene having softening tempeartures above 100° C., it has been heretofore necessary to form polymers such as poly-(p-tert.-butyl)-styrene by the polymerization of p-tert.-butyl styrene (U.S. Pat. No. 2,723,261). However, the process according to this latter patent entails a number of reaction steps in that it is necessary to first form monomeric p-tert.-butyl-styrene, which must be purified before the polymerization thereof. With these several operations, the overall process becomes quite expensive and it would be desirable to provide a more economical and simplified method of producing alkyl-substituted styrene.

It is therefore a principal object of this invention to provide an improved process of alkylating polymers of vinyl aromatic hydrocarbons.

Another object of the invention is to provide an economical process for the production of thermoplastic polymers of the alkyl-substituted polystyrene having high softening temperatures.

Still another object of the invention is the novel polymers produced by these processes.

These and other objects and advantages of the invention will become apparent by reference to the following description and claims appended hereto.

It has been surprisingly discovered that alkyl-substituted vinyl aromatic hydrocarbon polymers having high softening temperatures can be produced by alkylating polymers of styrene, in the presence of catalytic amounts of boron trifluoride, with 0.25 to 1 mol of tert.-butyl chloride per mol of polystyrene.

By "polystyrene" is meant homopolymerizates of styrene, preferably produced by bulk or suspension polymerization, as well as the copolymerizates of styrene with other copolymerizable monomers. Suitable copolymerizable monomers include particularly α-methyl-styrene.

In general, any copolymerizable monomer may be used to form the copolymers of styrene except those monomers which are unstable under the reaction conditions and in the presence of Friedel-Crafts-catalysts.

The alkylation catalyst employed in the present invention is gaseous boron trifluoride. It has been found that no perceptible decomposition of the alkylated polystyrene occurs when a boron trifluoride catalyst is employed, whereas the use of other Friedel-Crafts catalysts, such as aluminum chloride, tend to promote the partial decomposition of the polymers of styrene. In practice, the gaseous boron trifluoride is introduced during the reaction, by bubbling it through the liquid reaction mixture. Alternatively, the reaction mixture first is saturated with gaseous boron trifluoride and then the boron trifluoride is added in amounts to keep the mixture reacting.

It is preferred to carry out the alkylation process in the liquid phase using a medium which is a solvent for the polystyrene. Suitable solvents are, for example, carbon disulfide, methylene chloride, ethylene chloride, tetrachloroethane, tetrachloroethylene, chlorobenzene, bromobenzene, o-dichlorobenzene and m-dichlorobenzene. These solvents used also dissolve the tert.-butyl chloride. The process cannot be conducted in the gas phase. Other alkylation agents which could be used are, i.e., tert.-butylfluoride or tert.-butyl bromide.

The alkylation reaction according to the invention is conducted at temperatures of 20–40° C., preferably 30–40° C. and at atmospheric pressure. The amount of water that can be present in the reaction mixture is 5 to 5,000 p.p.m., preferably 10 to 1,000 p.p.m. The preferred amount is present by using customary solvents.

The tert.-butyl chloride to be used can be charged into the reaction mixture all at once, or it can be added incrementally in amounts adjusted to the quantity which is being consumed. Preferably, 0.25 to 1, more preferably 1 mol of tert.-butyl chloride is added per basic mol of polystyrene, charged. The expression "basic mol of polystyrene" means that quantity by weight of polystyrene corresponding to one mol of styrene or one mol of the mixture of styrene and the co-monomer. The tert.-butyl chloride substitutes preferably in para-position; besides substitution in meta- or 3,5-position is observed especially by using the alkylating agent in excess amounts. Up to a proportion one mol of tert.-butyl chloride to one basic mol of polystyrene the alkylating agent is consumed completely. Exceeding this proportion the tert.-butyl groups are consumed less than corresponding to the excess amounts used.

To evaluate the properties of the polymers of the present invention in terms of similar known polymers, copolymerizates of styrene and tert.-butyl styrene produced by suspension polymerization are compared in Table I with a polystyrene having the same K-value (H. Fikentscher, "Cellulosechemie," 13 (1958), p. 58) produced in accordance with this invention by alkylation with tert.-butyl chloride. It can be seen that the polymerizates of this invention have higher softening temperatures than the copolymerizates of a corresponding composition produced according to U.S. Pat. 2,723,261. The softening points are determined by the Test British Norm 1493/48, Appendix F. The samples' gage was 1.5 mm.

styrene having the same K-value produced in accordance with this invention by alkylation with tert.-butyl chloride.

TABLE II

|  | Impact strength notched, DIN 53 453 (cm. kp./cm.²) | Flexural strength, DIN 53 452 (kp./cm.²) | Dielectric strength, DIN 53 481/ VDE 0303 (kv./mm.) | Volume resistivity, DIN 53 482/ VDE 0303 (Ω cm.) | Surface resistance, DIN 53 482/ VDE 0303 (Ω) |
| --- | --- | --- | --- | --- | --- |
| Polystyrene, K-value 70 | 2.2 | 1,050 | >50 | $10^{16}$ | $10^{13}$ |
| Polystyrene, K-value 70 [1] | 2.0 | 800 | >50 | $10^{16}$ | $10^{13}$ |

[1] Alkylated with butyl chloride in a molar proportion of 1:1.

The importance of using the aforesaid quantities of alkylating agent in the production of the polymers of this invention is demonstrated in Table I; the softening temperatures of the polymers of this invention being reduced below acceptable levels when an excess of tert.-butyl chloride is used in the alkylation step.

TABLE I

| Copolymerizate of tert.-butyl styrene and styrene in a molar proportion | | Alkylation of polystyrene in a molar proportion | |
| --- | --- | --- | --- |
| Styrene:tert.-butyl styrene | Softening temperature,° | Basic mol of polystyrene: tert.-butyl chloride | Softening temperature,° |
| 3:1 | 107 | 4:1 | 115 |
| 1:1 | 115 | 2:1 | 121 |
| 1:3 | 122 | 4:3 | 132 |
| 0:1 | 130 | 1:1 | 140 |
|  |  | 2:3 | 118 |
|  |  | 1:2 | 92 |

Although it was thought that the softening temperature of the polymers of the present invention would be comparable to those produced from tert.-butyl styrene, it was surprisingly found that the polymerizates obtained in accordance with this invention exhibit far higher softening temperatures.

In practice, the alkylation process is preferably conducted by dissolving the polystyrene in the solvent whereupon the desired amount of tert.-butyl chloride is added thereto. With intensive agitation, gaseous boron trifluoride, at 20 to 40° C., is produced into the resulting mixture until the liberation of hydrogen chloride ceases. The hydrogen chloride produced in this reaction is continuously removed from the reaction vessel. If desired, the alkylation can be conducted with the simultaneous introduction of an inert gas such as nitrogen or air which is used as a carrier to more rapidly remove the produced hydrogen chloride.

Excess boron trifluoride is then desirably removed from the resulting alkylation mixture by passing air or another inert gas, particularly nitrogen, therethrough. Thereafter, the reaction solution is slowly added to methanol, ethanol, or isopropanol; the alkylated polystyrene forming a precipitate. Subsequently, the reaction product is washed with the alcohol, desirably the alcohol used as the precipitating agent, and the polymer is dried at room temperature or at slightly elevated temperatures, and at atmospheric pressure or under vacuum.

Alternatively, the alkylation process can be carried out by initially introducing into the reaction vessel only a portion of the tert.-butyl chloride to be reacted, the remainder of the alkylating agent being added slowly as the boron trifluoride is introduced. In yet another embodiment of the invention, the total amount of tert.-butyl chloride is slowly added while the boron trifluoride is introduced into the reaction vessel.

The thus-obtained polymerizates exhibit, in addition to the unexpectedly high softening temperatures, other desirable mechanical and electrical properties. In following Table II a known polystyrene is compared with a poly- They find particular use in applications requiring the use of materials with low water absorption, high chemical resistance, and solubility in organic solvents which are similar to those of polystyrene of equal K-value. The polymerizates of this invention can be shaped into articles by conventional methods such as molding, extrusion, calendering, spinning and well known techniques.

The novel polymerizates produced according to the invention are advantageously used in forming household and sanitary articles, foils, strips, plates, and other molded bodies which must, of necessity, remain dimensionally stable at elevated temperatures.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Polystyrene was alkylated by charging into a reaction vessel containing 1 liter of methylene chloride, 208 g. (2 basic mols) of suspension-polymerized polystyrene, having a K-value of 70, and 185 g. (2 mols) of tert.-butyl chloride. The equipment employed herein consisted of a reaction vessel provided with a gas inlet pipe, an agitator, a reflux cooler, a gas outlet pipe, and a partially immersed thermometer. While the reaction mixture was maintained at 30–40° C., gaseous boron trifluoride was introduced into the vigorously agitated solution, until the reaction is terminated and liberation of hydrogen chloride ceases. After the dissolved excess boron trifluoride is removed, by passing nitrogen through the reaction mixture, the resulting solution is added dropwise, while stirring, into a vessel containing 7 liters of methanol; the reaction product forming a precipitate of fine white flakes. This reaction product is removed from the methanol by vacuum filtration and the product is then washed with methanol, and dried.

The ultimate yield based on the mols of polystyrene charged amounted to 304 g. (95% of theory) and the product was found to have a softening temperature of 140° C. To determine the number of tert.-butyl radicals attached to each nucleus in the product, the hydrogen and carbon content of the polymer was determined. It was found that the polymer contains 89.87 weight percent of carbon and 10.11 weight percent of hydrogen which corresponds to a polymer having statistically one hundred tert.-butyl groups per one hundred styrene units, a monomer formula of $(C_{12}H_{16})_x$, and containing by theory 89.93 weight percent carbon and 10.07 weight percent hydrogen. By IR-(infra red) analysis was determined: 85% of the styrene nuclei are substituted in para-position (12.05μ), 5% are substituted in meta- (12.60μ; 14.10μ) or in 3,5-position (11.45μ, respectively 13.95μ) and 5% are unsubstituted (13.15μ; 14.30μ).

EXAMPLE 2

The alkylation process was repeated as in Example 1, with 208 g. (2 basic mols) of suspension-polymerized polystyrene having a K-value of 70 and 138.8 g. (1.5 mols) of tert.-butyl chloride. After the reaction product was worked up in the conventional manner there was obtained 275 g. (94% theoretical) of product having a softening temperature of 132° C. The carbon and hydrogen content of the alkylated polymer was 90.54 and 9.68, respectively, which corresponds to a polymer of the formula $(C_{11}H_{14})_x$ containing by theory 90.35 weight percent carbon and 9.65 weight percent hydrogen.

The polymer has statistically 75 tert.-butyl groups per one hundred styrene units. 60% of the styrene nuclei are substituted in para-position, about 10% in meta-position and less than 5% are substituted in 3,5-position, determined by IR-analysis.

EXAMPLE 3

208 g. (2 basic mols) of suspension-polymerized polystyrene having a K-value of 70 are alkylated, as described in Example 1, with 92.5 g. (1 mol) of tert.-butyl chloride. Upon working up the reaction product in the conventional manner, there was obtained 252 g. (95% theoretical) of alkylated product (having a softening temperature of 121° C.). The polymer was found to have a carbon and hydrogen content of 91.00 and 9.02 weight percent, respectively, which corresponds to a polymer of the formula $(C_{10}H_{12})_x$ containing by theory 90.85 weight percent carbon and 9.15 weight percent hydrogen. The polymer statistically has 50 tert.-butyl groups per one hundred styrene units. About 40% of the styrene nuclei are substituted in para-position and about 10% in meta-position, but no substitution is in 3,5-position, determined by IR-analysis.

EXAMPLE 4

208 g. (2 basic mols) of suspension-polymerized polystyrene having a K-value of 70 are alkylated, as described in Example 1, with 46.3 g. (0.5 mol) of tert.-butyl chloride. Upon working up the reaction product as in Example 1, there was obtained 227 g. (96% of theory) of a product having a softening temperature of 115° C. This product was found to contain 91.48% by weight of carbon and 8.46% by weight of hydrogen which corresponds closely to a polymer of the formula $(C_9H_{10})_x$ containing by theory 91.47% by weight carbon and 8.53% by weight hydrogen.

The polymer statistically has 25 tert.-butyl groups per 100 styrene units. 25% of the styrene nuclei are substituted in para-position, as demonstrated by IR-analysis (no substitution in meta- and in 3,5-position).

EXAMPLE 5

216 g. (2 basic mols) of a suspension-polymerized copolymerizate of 30% by weight of α-methyl-styrene and 70% by weight of styrene having a K-value of 55 are alkylated, as described in Example 1, with 185 g. (2 mols) of tert.-butyl chloride. Upon working up the reaction product there was obtained 315 g. (96% of theory) of a product having a softening temperature of 145° C. This product was found to contain 89.93% by weight of carbon and 10.07% by weight of hydrogen which corresponds closely to a polymer of formula $(C_{12.27}H_{16.55})_x$ containing by theory 89.83% by weight of carbon and 10.17% by weight of hydrogen. The polymer statistically has 100 tert.-butyl groups per one hundred styrene units. The IR-analysis corresponds to Example 1.

EXAMPLE 6

208 g. (2 basic mols) of suspension-polymerized polystyrene having a K-value of 70 are dissolved, as described in Example 1, in 1 liter of methylene chloride. While the resulting solution is maintained at 30–40° C., boron trifluoride in gaseous form is introduced into the vigorously agitated solution, while at the same time 185 g. (2 mols) of tert.-butyl chloride are added dropwise. After the reaction product is worked up as described in Example 1, there is obtained 298 g. (93% of theory) of a product having a softening temperature of 139° C. The product was found to contain 89.71% by weight of carbon and 9.94% by weight of hydrogen which corresponds to a polymer of the formula $(C_{12}H_{16})_x$ containing by theory 89.93% by weight of carbon and 10.07% by weight of hydrogen. The structure of the polymer and the IR-analysis obtained from, corresponds to the polymer of Example 1.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the production of thermoplastic polymers of alkyl-substituted styrene having high softening temperatures, said process comprising:

reacting a polymer of styrene selected from the group consisting of polystyrene and copolymers of styrene with α-methyl-styrene with tert.-butyl chloride at 20–40° C. in the presence of catalytic amounts of boron trifluoride, the mol ratio of reactants being about 0.25–1.5 mol of tert.-butyl chloride per basic mol of polystyrene.

2. Process as defined by claim 1 wherein there is employed in the reaction 0.75 to 1 mol of tert.-butyl chloride per basic mol of polystyrene.

3. Process as defined by claim 1 wherein said reaction is conducted at 30–40° C.

References Cited

UNITED STATES PATENTS

| | | | |
|---|---|---|---|
| 2,072,120 | 3/1937 | Mikeska et al. | 260—93.5A |
| 2,723,261 | 11/1955 | Levine et al. | 260—93.5 |
| 3,137,682 | 6/1964 | Corson et al. | 260—93.5 |
| 2,661,335 | 12/1953 | Butler | 260—93.5A |
| 2,786,032 | 3/1957 | Hollyday | 260—93.5A |

OTHER REFERENCES

Journal of Polymer Science, Part A–1, vol. 5, 1967, pp. 2187–2191.

JAMES A. SEIDLECK, Primary Examiner

U.S. Cl. X.R.

260—88.2

UNITED STATES PATENT OFFICE
CERTIFICATE OF CORRECTION

Patent No. 3,546,194          Dated December 8, 1970

Inventor(s)  JOSEF DASCH and ANTON SCHICK

It is certified that error appears in the above-identified patent and that said Letters Patent are hereby corrected as shown below:

Column 3, Line 46, change "produced" to ---introduced

Signed and sealed this 18th day of May 1971.

(SEAL)
Attest:

EDWARD M. FLETCHER, JR.          WILLIAM E. SCHUYLER, JR.
Attesting Officer                Commissioner of Patents